United States Patent
Whitley et al.

(10) Patent No.: US 7,350,521 B2
(45) Date of Patent: *Apr. 1, 2008

(54) SIMPLIFIED DUAL MODE MEDICAL OXYGEN CONCENTRATOR

(75) Inventors: Roger Dean Whitley, Allentown, PA (US); Glenn Paul Wagner, Fogelsville, PA (US); Matthew James LaBuda, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 361 days.

This patent is subject to a terminal disclaimer.

(21) Appl. No.: 11/034,673

(22) Filed: Jan. 13, 2005

(65) Prior Publication Data

US 2005/0161043 A1 Jul. 28, 2005

Related U.S. Application Data

(63) Continuation-in-part of application No. 10/762,785, filed on Jan. 22, 2004, now Pat. No. 7,273,051.

(51) Int. Cl.
*A62B 7/00* (2006.01)
*A62B 9/00* (2006.01)
*G05B 1/00* (2006.01)
*B01D 53/02* (2006.01)
*B01D 59/26* (2006.01)

(52) U.S. Cl. .................. 128/205.11; 95/96; 95/130; 95/148; 96/121; 96/130; 96/143

(58) Field of Classification Search ........... 128/200.11, 128/200.24, 204.18, 204.21–204.25, 205.11–205.12; 96/121, 122, 130, 133, 143; 95/90, 96, 130, 95/148

See application file for complete search history.

(56) References Cited

U.S. PATENT DOCUMENTS 4,826,510 A 5/1989 McCombs (Continued)

FOREIGN PATENT DOCUMENTS

EP 1 157 731 A 11/2001

(Continued)

OTHER PUBLICATIONS

U.S. Appl. No. 10/295,144, filed Nov. 15, 2002, Wagner.

*Primary Examiner*—Justine R. Yu
*Assistant Examiner*—Kristen C. Matter
(74) *Attorney, Agent, or Firm*—John M. Fernbacher; Anne B. Kiernan

(57) ABSTRACT

Oxygen concentrator system having a portable oxygen generator unit adapted to generate a non-humidified oxygen-rich gas and a stationary base unit adapted to generate a humidified oxygen-rich gas, wherein the portable oxygen generator unit and the stationary base are adapted for operation in a coupled mode and an uncoupled mode. The portable oxygen generator unit includes a first flow coupling adapted to receive the humidified oxygen-rich gas when operating in the coupled mode, piping means adapted to combine the non-humidified oxygen-rich gas and the humidified oxygen-rich gas to form a humidified oxygen-rich gas product, and an oxygen-rich gas product delivery port. The stationary base unit is adapted to recharge a rechargeable power supply system in the portable oxygen generator unit when the units are coupled.

25 Claims, 5 Drawing Sheets

U.S. PATENT DOCUMENTS

| | | | |
|---|---|---|---|
| 5,071,453 A * | 12/1991 | Hradek et al. | 96/111 |
| 5,354,361 A | 10/1994 | Coffield et al. | |
| 5,893,944 A * | 4/1999 | Dong | 96/114 |
| 6,033,457 A * | 3/2000 | Lawless | 95/4 |
| 6,095,138 A * | 8/2000 | Hognelid et al. | 128/204.18 |
| 6,478,857 B2 | 11/2002 | Czabala | |
| 6,520,176 B1 | 2/2003 | Dubois | |
| 6,547,851 B2 | 4/2003 | Warren | |
| 6,551,384 B1 | 4/2003 | Ackley et al. | |
| 2002/0096174 A1 * | 7/2002 | Hill et al. | 128/205.11 |
| 2003/0005928 A1 | 1/2003 | Appel et al. | |

FOREIGN PATENT DOCUMENTS

| | | |
|---|---|---|
| WO | WO 02/11861 A | 2/2002 |

* cited by examiner

SIMPLIFIED DUAL MODE MEDICAL OXYGEN CONCENTRATOR

CROSS-REFERENCE TO RELATED APPLICATIONS

This application is a Continuation-In-Part of Ser. No. 10/762,785, now U.S. Pat. No. 7,273,051 which was filed on Jan. 22, 2004 and which is incorporated herein by reference.

BACKGROUND OF THE INVENTION

The supply of therapeutic oxygen to patients in homes and other residential settings is an important and growing segment of the health care industry. Oxygen can be supplied to a patient by liquid or compressed oxygen with an appropriate vaporization or pressure regulation system and a gas delivery cannula. Alternatively, oxygen can be supplied by the generation of oxygen using a small onsite air separation device located near the patient that delivers the generated oxygen via a cannula. This latter mode of oxygen supply is preferred by many patients, and numerous small air separation devices have been developed in response to this demonstrated need.

Respiratory oxygen usage rates typically range up to 3 LPM (liters per minute at 22° C. and 1 atma pressure) for ambulatory patients with relatively low oxygen requirements, up to 5 LPM for patients with more serious respiratory problems and possibly limited mobility, and in certain cases up to 10 LPM for those with the most serious respiratory problems and more limited mobility. A patient initially may require a higher oxygen supply rate during an illness and later may require less oxygen as recovery is achieved. Alternatively, a patient may require increasing oxygen rates as a chronic condition worsens. Patient oxygen requirements thus are highly variable, and the maximum oxygen requirement may be three to five times the minimum oxygen requirement.

Residential or home oxygen generation systems therefore must be designed for a wide range of oxygen production rates in order to meet these diverse patient requirements. A provider of home oxygen generators typically will prefer to limit the number of different systems offered for sale while still meeting patient requirements. The economic design of small oxygen generation systems with high turndown ratios is difficult, and it may be necessary for a provider to offer several sizes of generators to meet patient needs. It is desirable for economic reasons to minimize the number of oxygen generation system offerings and to maximize the turndown ratio of each system offered. In addition, it is desirable to meet both ambulatory and non-ambulatory oxygen requirements with a single generator system when possible and to provide humidified oxygen when necessary.

BRIEF SUMMARY OF THE INVENTION

An embodiment of the invention relates to an oxygen concentrator system comprising two components, the first of which is a portable oxygen generator unit that includes a portable air separation device for the generation of a non-humidified oxygen-rich gas, a first gas pump including means to supply air to the portable air separation device, a first motor adapted to drive the first gas pump, a rechargeable power supply system adapted to provide power to drive the first motor, a first connector adapted to provide recharging of the rechargeable power supply system, a first flow coupling adapted to receive a humidified oxygen-rich gas, piping means adapted to combine the non-humidified oxygen-rich gas and the humidified oxygen-rich gas to form a humidified oxygen-rich gas product, and an oxygen-rich gas product delivery port. The second component includes a stationary base unit adapted to couple with the portable oxygen generator unit, wherein the stationary base unit comprises a stationary air separation device and a humidifier for generating the humidified oxygen-rich gas, a second gas pump including means to supply air to the stationary air separation device, a second motor adapted to drive the second gas pump, a second flow coupling adapted to connect with the first flow coupling, piping to transfer the humidified oxygen-rich gas to the second flow coupling, a stationary power supply system adapted to provide power to the secondary motor, and a second connector adapted to connect with the first connector to provide recharging of the rechargeable power supply system in the portable oxygen generator unit when the units are coupled.

In this embodiment, the first flow coupling, piping means adapted to combine the non-humidified oxygen-rich gas and the humidified oxygen-rich gas, and the oxygen-rich gas product delivery port may be attached to and disposed externally to the portable oxygen generator unit. The portable air separation device may be sized to generate 0.5 to 3 LPM of non-humidified oxygen-rich gas, the first gas pump may be sized to provide sufficient air for the portable air separation device to generate 0.5 to 3 LPM of non-humidified oxygen-rich gas, the first motor may be sized to drive the first gas pump to provide sufficient air to the portable air separation device to generate 0.5 to 3 LPM of non-humidified oxygen-rich gas, the second gas pump may be sized to provide sufficient air to the stationary air separation device to generate 0 to 7 LPM of humidified oxygen-rich gas, and the second motor may be sized to drive the second gas pump to provide sufficient air to the stationary air separation device to generate 0 to 7 LPM of humidified oxygen-rich gas.

The first gas pump may include means to withdraw gas from the portable air separation device and the second gas pump mat include means to withdraw gas from the stationary air separation device. The portable oxygen generator unit may further comprise a storage tank adapted to hold the non-humidified oxygen-rich gas. The portable oxygen generator unit may further comprise a conserver adapted to regulate the flow of non-humidified oxygen-rich gas product supplied to the user by the cannula attached to the oxygen-rich gas product delivery port.

The portable air separation device may comprise a pressure swing adsorption system and may further comprise a storage tank adapted to receive non-humidified oxygen-rich gas from the pressure swing adsorption system. Alternatively, no gas storage tank may be provided to receive non-humidified oxygen-rich gas from the pressure swing adsorption system.

The stationary air separation device may comprise a pressure swing adsorption system and may further comprise a storage tank adapted to receive non-humidified oxygen-rich gas from the pressure swing adsorption system. Alternatively, no gas storage tank may be provided to receive non-humidified oxygen-rich gas from the pressure swing adsorption system. The stationary base unit may further comprise a spare rechargeable power supply and means to recharge the spare rechargeable power supply.

The rechargeable power supply system in the portable air separation device may be a rechargeable battery, and may include an AC to DC power converter and a DC battery charger adapted to recharge the rechargeable battery. The portable air separation device may further comprise a power connector to receive DC power from an external source.

The rechargeable power supply system of the portable oxygen generator unit may include a portable fuel cell system comprising a fuel cell and portable fuel storage means. The fuel may be hydrogen or methanol. The stationary power supply system may comprise a stationary fuel cell system, stationary fuel storage means, and piping and connector means to transfer fuel to the portable fuel storage means when the stationary base unit is coupled with the portable oxygen generator unit. The fuel may be hydrogen or methanol.

Another embodiment of the invention includes a method to generate an oxygen-rich gas product that includes providing an oxygen concentrator system comprising two components. The first component includes a portable oxygen generator unit that includes a portable air separation device for the generation of a non-humidified oxygen-rich gas, a first gas pump including means to supply air to the portable air separation device, a first motor adapted to drive the first gas pump, a rechargeable power supply system adapted to provide power to drive the first motor, a first connector adapted to provide recharging of the rechargeable power supply system, a first flow coupling adapted to receive a humidified oxygen-rich gas, piping means adapted to combine the non-humidified oxygen-rich gas and the humidified oxygen-rich gas to form a humidified oxygen-rich gas product, and an oxygen-rich gas product delivery port. The second component includes a stationary base unit adapted to couple with the portable oxygen generator unit, wherein the stationary base unit comprises a stationary air separation device and a humidifier for generating the humidified oxygen-rich gas, a second gas pump including means to supply air to the stationary air separation device, a second motor adapted to drive the second gas pump, a second flow coupling adapted to connect with the first flow coupling, piping to transfer the humidified oxygen-rich gas to the second flow coupling, a stationary power supply system adapted to provide power to the secondary motor, and a second connector adapted to connect with the first connector to provide recharging of the rechargeable power supply system in the portable oxygen generator unit when the units are coupled.

The portable oxygen generator unit and the stationary base unit may be operated in an uncoupled mode wherein the portable oxygen generator unit is utilized to separate air and provide the non-humidified oxygen-rich gas as an oxygen-rich gas product at a first flow rate to a user via a cannula attached to the oxygen-rich gas product delivery port. The portable oxygen generator unit and the stationary base unit also may be operated in a coupled mode by coupling the portable oxygen generator unit and the stationary base unit by connecting the first and second connectors and connecting the first and second flow couplings. In this mode, the portable oxygen generator unit is operated to separate air and provide the non-humidified oxygen-rich gas. The stationary base unit is operated to separate air and provide an oxygen-rich gas stream and to humidify the oxygen-rich gas stream to provide the humidified oxygen-rich gas. The humidified oxygen-rich gas is combined with the non-humidified oxygen-rich gas to form a humidified oxygen-rich gas product, and the humidified oxygen-rich gas product is supplied at a second flow rate to a user via the cannula attached to the oxygen-rich gas product delivery port, wherein the second flow rate is greater than the first flow rate.

The portable oxygen generator unit may be operated in the uncoupled mode and may generate the non-humidified oxygen-rich gas at a flow rate in the range of 0.5 to 3 LPM. The portable oxygen generator unit and the stationary base unit may be operated in the coupled mode and the coupled system generates the humidified oxygen-rich gas product at a flow rate in the range of 0.5 to 10 LPM. The humidified oxygen-rich product gas contains greater than 85 mole % oxygen. The first motor may be driven by externally-provided DC power when the portable oxygen generation unit is operated in the uncoupled mode.

BRIEF DESCRIPTION OF SEVERAL VIEWS OF THE DRAWINGS

Embodiments of the invention are illustrated by the following drawings, which are not necessarily to scale.

DETAILED DESCRIPTION OF THE INVENTION

The embodiments of the invention relate to an oxygen concentrator system comprising a portable oxygen generator unit and a stationary base unit adapted to couple with the portable oxygen generator unit. The oxygen concentrator system also may be described as an oxygen generation system, and these two descriptors are interchangeable. The portable oxygen generator unit includes a portable air separation device for the generation of an oxygen-rich gas, a primary gas pump including means to supply air to the portable air separation device, a primary motor to drive the gas pump, a rechargeable power supply to drive the motor, connector means adapted to recharge the rechargeable power supply in the portable oxygen generator unit, connector means to transfer the oxygen-rich gas from the portable oxygen generator unit, and a first oxygen-rich gas product discharge port. The stationary base unit is adapted to couple with the portable oxygen generator unit, and the stationary base unit comprises a stationary power supply system including connector means adapted to recharge the rechargeable power supply in the portable oxygen generator unit, flow coupling means to receive the oxygen-rich gas from the portable oxygen generator unit, and optionally a second oxygen-rich gas product discharge port.

Figure 1:
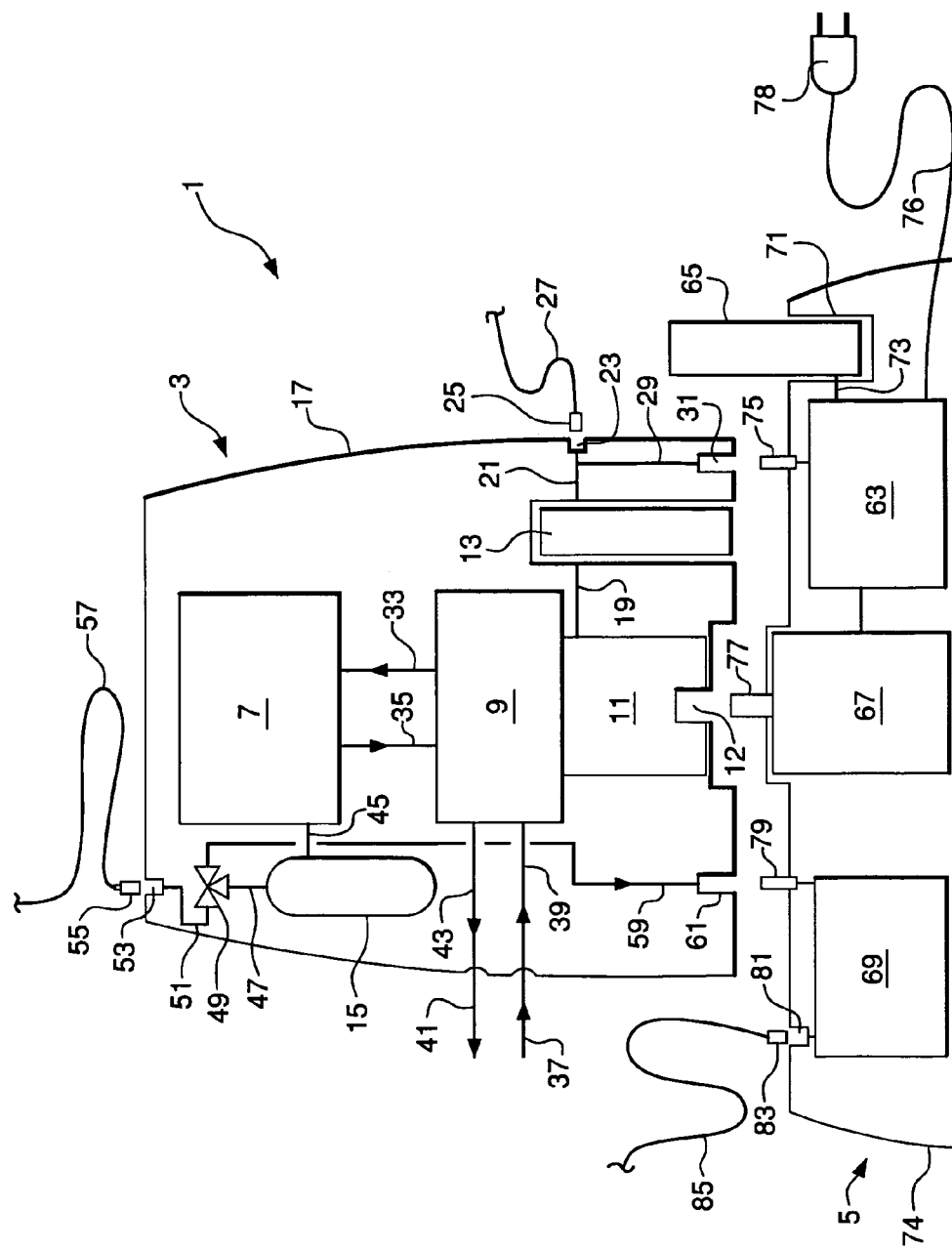
FIG. 1 is a schematic diagram of a first embodiment of the invention.

A first embodiment of the invention is illustrated in FIG. 1. In this exemplary embodiment, oxygen concentrator system 1 comprises portable oxygen generator unit 3 and stationary base unit 5, shown here in the uncoupled mode. Portable oxygen generator unit 3 includes air separation device 7, gas pump 9, gas pump primary drive motor 11, rechargeable power supply 13, and optional product storage tank 15 to store oxygen-rich gas product. Rechargeable power supply 13 drives motor 11 and provides power to a user display/control panel (not shown). These components are disposed within enclosure or case 17.

Rechargeable power supply 13, which may be a rechargeable battery, provides DC power via conductor 19 to primary drive motor 11. If the battery runs low, DC power to primary drive motor 11 may be provided optionally via conductor 21, which may be connected via connectors 23 and 25 to conductor 27. When externally-supplied DC power is supplied to primary drive motor 11, the battery is recharged if required. Conductor 27 may supply DC power from an outside DC power source (not shown) such as, for example, a DC power outlet in a motor vehicle or any other DC power supply. Alternatively, DC power in conductor 27 may be provided from an optional AC to DC converter (not shown) connected to an external AC power source.

When rechargeable power supply 13 is a battery, it may be recharged by DC power provided via conductor 29 and connector 31 when portable oxygen generator unit 3 is coupled with stationary base unit 5 as described below.

Air separation device 7 may be a pressure swing adsorption (PSA) unit (described below) which receives pressurized feed air via line 33 from gas pump 9 and from which waste gas is withdrawn via line 35 by gas pump 9. Gas pump 9 draws feed air 37 through an inlet port and via line 39 and discharges waste gas 41 from a discharge port connected to line 43. Gas pump 9 typically includes a feed gas compressor taking in atmospheric air and discharging compressed feed air to the PSA system at 1 to 2.5 atma. Gas pump 9 also typically includes a waste gas compressor withdrawing waste gas from the PSA system at pressures above and/or below atmospheric pressure and discharging waste gas at near atmospheric pressure. The feed and waste gas compressors typically are both operated by gas pump primary drive motor 11. The drive motor may be fitted with shaft connector 12 adapted to couple with the shaft of a booster motor as described later.

The feed and waste gas compressors of gas pump 9 may be any type of compressor known in the art and may be selected from scroll, diaphragm, piston, and rotary vane compressors. A scroll compressor is well-suited for service with the air separation devices described herein.

Oxygen-rich gas, defined herein as a gas containing greater than 80 mole % oxygen, is withdrawn from air separation device 7 via line 45 into optional product storage tank 15. Typically, the oxygen-rich gas contains greater than 90 mole % oxygen. The oxygen-rich gas is withdrawn from product storage tank 15 via line 47 and passes to flow direction valve 49 having an inlet and two outlets. One outlet is connected to line 51 and product discharge port or outlet flow coupling 53, which can be coupled with and uncoupled from flow coupling 55 as described later. Flow coupling 55 is attached to cannula 57 for delivering oxygen-rich product gas to a patient when portable oxygen generator unit 3 is operated in the portable or uncoupled mode. The other outlet of flow direction of valve 49 is connected to line 59 for delivery of the oxygen-rich gas to outlet coupling 61. Valve 49 may be designed and located such that the act of coupling portable oxygen generator unit 3 and stationary base unit 5 directs product gas flow through line 59 and the act of uncoupling directs product gas flow through line 51.

In an alternative embodiment (not shown), flow direction valve 49 may be replaced by two separate valves which may be designed and located such that the act of coupling portable oxygen generator unit 3 and stationary base unit 5 directs product gas flow through line 59 and the act of uncoupling directs product gas flow through line 51. Flow couplings 53 and 55 may be two parts of a quick-connect fitting in which stationary part 53 has an integral mechanically-activated valve that opens when connected with flow coupling 55 and closes when disconnected from flow coupling 55. Likewise, flow couplings 61 and 79 may be two parts of a similar quick-connect fitting. In addition, flow couplings 81 and 83 may be two parts of a similar quick-connect fitting.

In one operating mode of oxygen generation system 1, therefore, oxygen-rich gas product is delivered to the patient via cannula 57 when portable oxygen generator unit 3 operates in the portable mode, i.e., is uncoupled from stationary base unit 5. In the other operating mode, oxygen-rich gas product is delivered to the patient via cannula 85 when portable oxygen generator unit 3 is coupled with stationary base unit 5 and the coupled units are stationary.

Stationary base unit 5 comprises stationary power supply system 63, optional spare rechargeable power supply 65, which may be a rechargeable battery, booster motor 67, and optional product gas humidifier 69. Booster motor may be an AC motor or a DC motor; a DC motor would be used if variable-speed operation is required. Stationary power supply system 63 includes an AC to DC power converter and a DC battery charger adapted, for example, to recharge a rechargeable battery or batteries. This system may be used to recharge rechargeable power supply 13 when portable oxygen generator unit 3 and stationary base unit 5 are coupled. The optional spare rechargeable power supply 65 may be a rechargeable battery and may be held in receptacle 71 and recharged via conductor 73 from stationary power supply system 63. All components in stationary base unit 5 are disposed within enclosure 74. Stationary power supply system 63 is connected to an external AC power supply by conductor 76 and plug 78.

Stationary base unit 5 has several couplings and connectors which can be coupled and connected with corresponding couplings and connectors on portable oxygen generator unit 3. Connector 75 is adapted to connect with connector 31 for recharging rechargeable power supply 13. Shaft coupling 77, which is driven by booster motor 67, can be coupled with shaft connector 12 so that booster motor 67 can be operated in tandem with primary drive motor 11 to provide additional power to operate gas pump 9 at higher capacity. Flow coupling 79 can be coupled with oxygen-rich gas outlet flow coupling 61 to deliver oxygen-rich gas to optional humidifier 69. Oxygen-rich product gas discharge port or flow coupling 81 can be coupled with and uncoupled from flow coupling 83 as described later. Flow coupling 83 is attached to cannula 85 for delivering oxygen-rich product gas to a patient.

Stationary base unit 5 and portable oxygen generator unit 3 can be operated in two modes. In a first mode, stationary base unit 5 and portable oxygen generator unit 3 are uncoupled and portable oxygen generator unit 3 is operated independently to supply oxygen-rich product gas to an ambulatory patient who may carry the portable unit. The portable unit may be powered by rechargeable power supply 13 or alternatively may be powered by external DC power via connectors 23 and 25 and conductor 27. Conductor 27 may supply DC power from an outside DC power source (not shown) such as, for example, a DC power outlet in a motor vehicle or any other DC power supply. Alternatively, DC power in conductor 27 may be provided from an optional AC to DC converter (not shown) connected to an external AC power source. During this mode of operation, stationary base unit 5 is on standby and may be recharging optional spare rechargeable power supply 65.

In the second mode of operation, stationary base unit 5 and portable oxygen generator unit 3 are coupled and operated in tandem to supply oxygen-rich product gas to a non-ambulatory patient located adjacent the coupled unit. In this mode, shaft coupling 77 is coupled with shaft connector 12 so that booster motor 67 operates in tandem with primary drive motor 11 to provide additional power to operate gas pump 9 at higher capacity. Flow coupling 79 is coupled with oxygen-rich gas outlet flow coupling 61 and delivers this gas to optional humidifier 69. Oxygen-rich product gas discharge port or flow coupling 81 is coupled with flow coupling 83 and oxygen-rich product gas is delivered to the patient via cannula 85. While operating in this tandem mode, rechargeable power supply 13 can be recharged by power supply system 63 via connectors 31 and 75, conductor 29, and conductor 21. Spare power supply system 65 also may be recharged via conductor 73.

In an alternative version of this first embodiment, all power to drive gas pump 9 in the coupled mode is supplied by motor 67 via shaft coupling 77 and shaft connector 12. Motor 67 is a larger motor than that used as the booster motor in the initial version of this embodiment described above. Primary drive motor 11 is not operated in this alternative version, and therefore the service life of this motor is increased because the motor is operated only in the portable mode.

Figure 2:
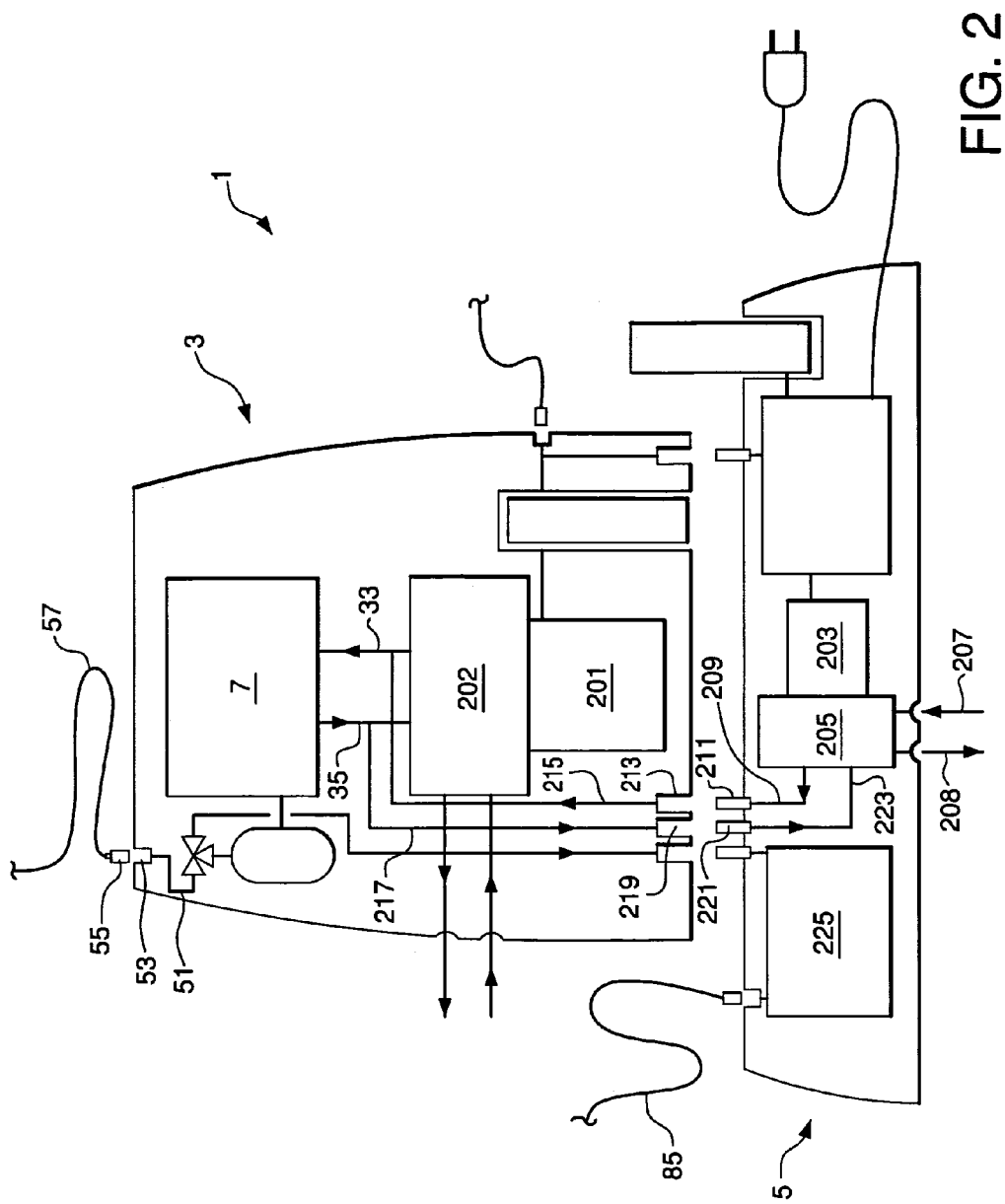
FIG. 2 is a schematic diagram of a second embodiment of the invention.

A second embodiment of the invention is illustrated in FIG. 2. In this exemplary embodiment, oxygen generation system 1 comprises portable oxygen generator unit 3 and stationary base unit 5, shown here in the uncoupled mode. Portable oxygen generator unit 3 and stationary base unit 5 of FIG. 1 are modified in this second embodiment so that supplementary feed air is supplied from the base unit to the portable unit and waste gas is withdrawn from the portable unit to the base unit when the units operate in the tandem or coupled mode. All other features and components typically are identical to those described above with reference to FIG. 1. In this second embodiment, booster motor 67 of FIG. 1 is not used and the primary drive motor of portable unit 3 operates independently at all times.

In FIG. 2, primary drive motor 201 drives gas pump 202 in both the coupled and uncoupled operating modes in a manner similar to that of primary drive motor 11 and gas pump 9 of FIG. 1, except that primary drive motor 201 operates independently and is not coupled to a booster motor. In the coupled mode, drive motor 203 drives supplemental gas pump 205, which draws supplemental feed air 207 through an inlet port and discharges waste gas 208 from a discharge port, wherein the inlet and discharge ports are connected to supplemental gas pump 205. Gas pump 205 typically includes a feed gas blower taking in atmospheric air 207 and discharging supplemental compressed feed air to air separation device 7, which may be a PSA system, at 1 to 4 atma via line 209, flow coupling 211, flow coupling 213, and line 215 joining line 33 to air separation device 7. Gas pump 205 also typically includes a discharge gas blower for withdrawing gas from air separation device 7 at pressures above and/or below atmospheric pressure via line 217, flow coupling 219, flow coupling 221, and line 223, and discharging gas 208 from gas pump 205 at near atmospheric pressure. The withdrawn gas may be PSA system waste gas. The feed blower and discharge gas blower typically are both operated by gas pump drive motor 203.

In this second embodiment, portable oxygen generator unit 3 operates in the uncoupled mode as described for the first embodiment. In the coupled mode, the coupled systems of the second embodiment operate as described for the first embodiment except for the modifications described immediately above. This second embodiment allows a reduction in the size of the gas pump in portable oxygen generator unit 3, wherein gas pump 202 of FIG. 2 is smaller than gas pump 9 of FIG. 1, thereby reducing the weight of portable oxygen generator unit 3.

In an alternative version of this second embodiment, all feed air in the coupled operating mode is supplied to air separation device 7 by gas pump 205 via lines 209 and 215, and all waste gas is withdrawn from air separation device 7 via lines 217 and 223 by gas pump 205. In this alternative version, the capacity of gas pump 205 and output of drive motor 203 are increased over the initial version of the embodiment described above. Primary drive motor 201 and gas pump 202 are not operated in this alternative version, and therefore the service lives of this motor and pump are increased because they are operated only in the portable mode.

Figure 3:
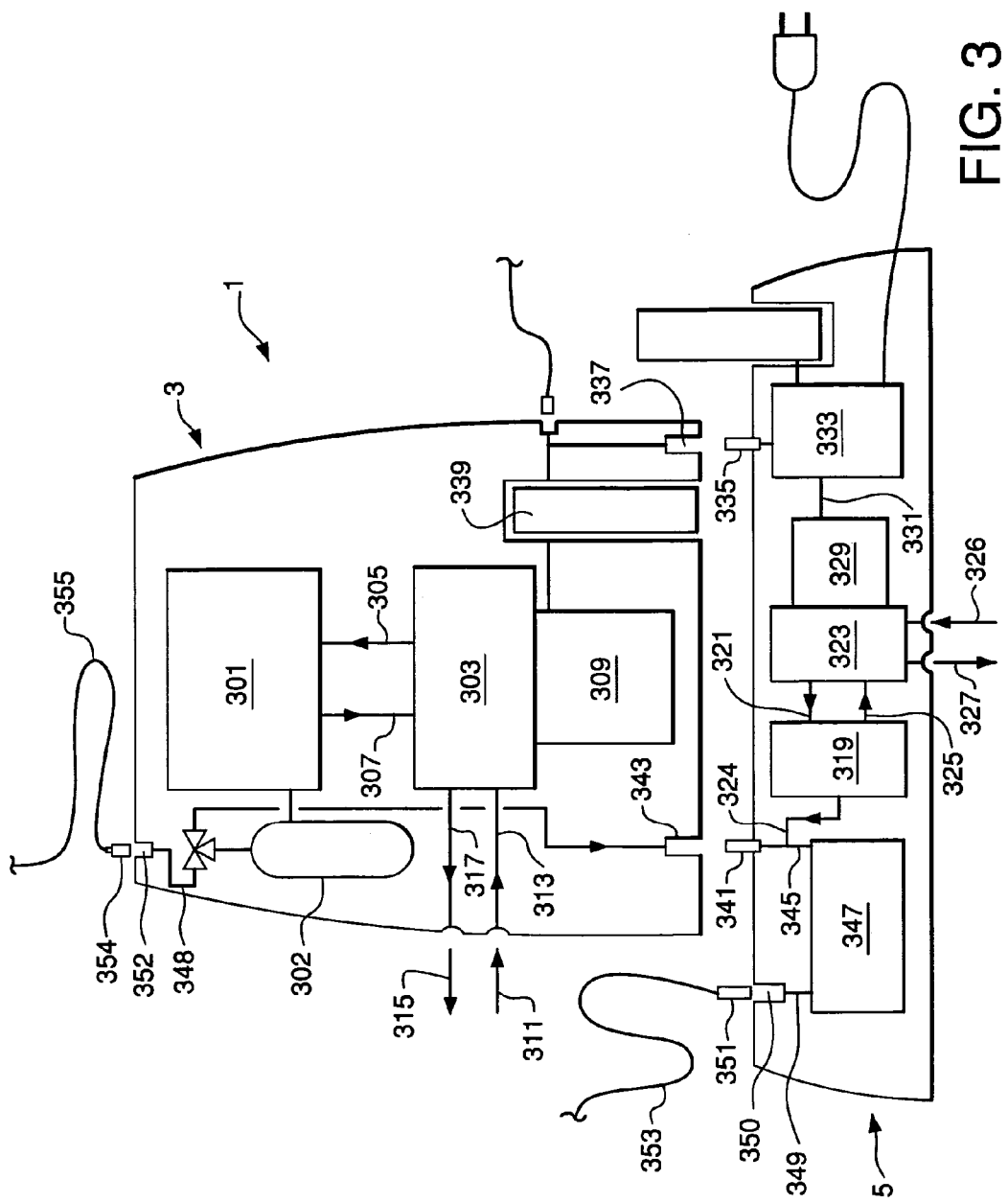
FIG. 3 is a schematic diagram of a third embodiment of the invention.

A third embodiment of the invention is illustrated in FIG. 3. In this exemplary embodiment, oxygen generation system 1 comprises portable oxygen generator unit 3 and stationary base unit 5, shown here in the uncoupled mode. Portable oxygen generator unit 3 and stationary base unit 5 of FIG. 1 are modified in this third embodiment so that the maximum production capacity of the air separation device in the portable unit is reduced and an air separation device is included in the stationary base unit for operation in either or both of the coupled and uncoupled modes. All other features and components typically are identical to those described above with reference to FIG. 1.

In the uncoupled mode of operation in this third embodiment, air separation device 301, for example a PSA system, receives pressurized feed gas from gas pump 303 and gas pump 303 withdraws gas, for example waste gas, from air separation device 301 via lines 305 and 307, respectively. Gas pump 303, which is driven by primary drive motor 309, draws feed air 311 through an inlet port and via line 313 and discharges waste gas 315 from a discharge port connected to line 317. Gas pump 303 typically includes a feed blower taking in atmospheric air and discharging compressed-feed air to air separation device 301, which may be a PSA system, at 1 to 2.5 atma. Gas pump 303 also typically includes a discharge gas blower withdrawing gas from air separation device 301. The withdrawn gas may be waste gas withdrawn from a PSA system at pressures above and/or below atmospheric pressure that is discharged at near atmospheric pressure. The feed blower and discharge gas blower typically are both operated by gas pump primary drive motor 309.

In this third embodiment, stationary base unit 5 includes air separation device 319, which may be a pressure swing adsorption (PSA) unit, and the device receives pressurized feed air via line 321 from gas pump 323 and provides oxygen-rich gas via line 324. Discharge gas is withdrawn from air separation device 319 via line 325 by gas pump 323. Gas pump 323 draws feed air 326 through an inlet port and discharges withdrawn gas 327 from a discharge port. Gas pump 323 typically includes a feed blower taking in atmospheric air and discharging compressed feed air, for example to a PSA system, at 1 to 2.5 atma. Gas pump 323 also typically includes a blower withdrawing discharge gas from air separation device 319 at pressures above and/or below atmospheric pressure and discharging this gas at near atmospheric pressure. The withdrawn gas may be PSA system waste gas. The feed blower and waste gas blower typically are both operated by gas pump drive motor 329, which receives power via conductor 331 from power supply system 333. Motor 329 may be an AC or a DC motor; a DC motor would be used if variable speed operation is required.

Stationary base unit 5 includes connector 335 which may be connected with connector 337 in portable oxygen generator unit 3 to recharge rechargeable power supply 339 when portable oxygen generator unit 3 and stationary base unit 5 are coupled together. The base unit also includes flow coupling 341 which is connected with flow coupling 343 in portable oxygen generator unit 3 to allow oxygen-rich gas to flow from air separation device 301 via optional product gas storage tank 302 when portable oxygen generator unit 3 and stationary base unit 5 are coupled together. In this coupled mode, combined oxygen-rich gas from air separation devices 301 and 319 flows via line 345 into humidifier 347. Flow coupling 350 in stationary base unit 5 and flow coupling 351 are coupled to provide final oxygen-rich product gas to the patient via cannula 353. Optionally, stationary base unit 5 may be operated in the uncoupled mode to provide oxygen-rich product gas at a lower flow rate when portable oxygen generator unit 3 is on standby or is out for servicing.

The third embodiment described above minimizes the weight of portable oxygen generator unit 3 compared with that of the first and second embodiments described earlier because air separation device 301 may be sized to provide the only required amount of oxygen-rich product gas required from portable oxygen generator unit 3 operating in the uncoupled mode. In contrast, air separation device 7 of the first and second embodiments is sized to provide all or a portion of the oxygen-rich product gas required from portable oxygen generator unit 3 and stationary base unit 5 when operating in the coupled mode. Thus air separation device 301 of FIG. 3 may be lighter than air separation device 7 of FIGS. 1 and 2.

The type of gas pump 319 in the stationary base unit can be different than the type of gas pump 303 of the portable unit used in the portable generator, since low weight, low volume, and power efficiency are less critical for the base unit than for the portable unit. The air separating device and process of the base unit also may be different from that of the portable unit, also since low weight, low volume, and power efficiency are less critical for the base unit than the portable unit.

Figure 4:
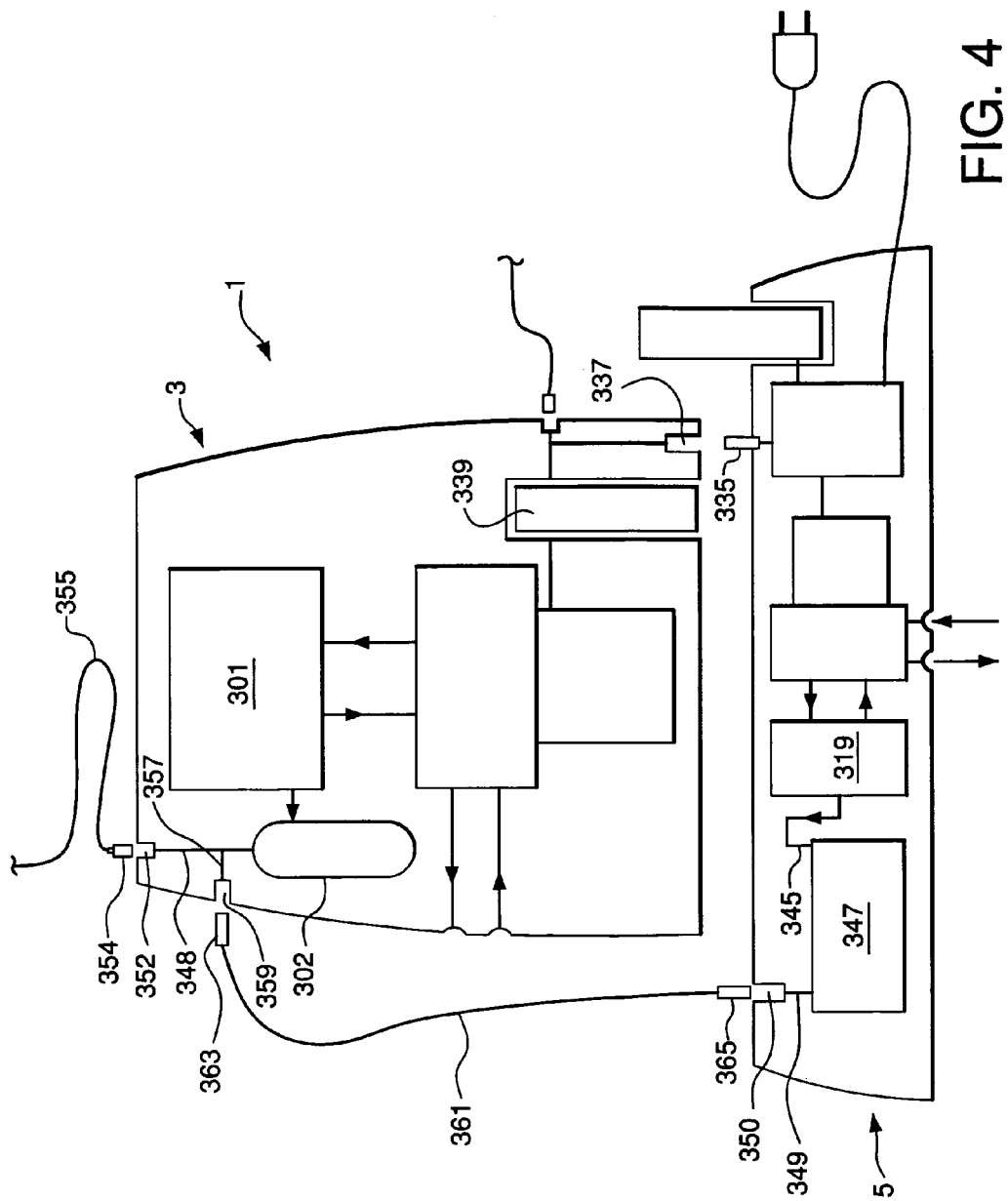
FIG. 4 is a schematic diagram of a simplified version of the embodiment of FIG. 3.

A fourth embodiment of the invention is illustrated in FIG. 4 and is a simplified version of the system of FIG. 3. In the embodiment of FIG. 4, flow coupling 341, flow coupling 343, the three-way valve in line 348 between optional product storage tank 302 and flow connector 352, and the line from flow coupling 343 to the three-way valve of FIG. 3 are eliminated. Branch line 357 is connected to line 348 and flow coupling 359 is connected to branch line 357. Connector line 361, which may be disposed externally to portable oxygen generator unit 3 and stationary base unit 5 as shown, may be fitted at either end with flow couplings 363 and 365. Connector line 361 may be either a flexible line as shown or a length of rigid tubing; alternatively, it may be a length of flexible tubing or rigid tubing connected directly to line 349 without the use of flow couplings 350 and 365. Flow coupling 359 is fitted with a mechanically-activated shutoff valve that is in the open position when flow couplings 359 and 363 are connected and in the closed position when flow couplings 359 and 363 are disconnected. Flow couplings 359 and 363 may be, for example, any commercially-available quick coupling or quick-connect fitting with a flow shutoff when disconnected. The remaining parts of oxygen generation system 1, which comprises portable oxygen generator unit 3 and stationary base unit 5, are the same as described with reference to FIG. 3.

In the embodiment of FIG. 4, portable oxygen generator unit 3 operates in the uncoupled or portable mode similar to that described earlier for the embodiment of FIG. 3. In this portable mode, flow couplings 359 and 363 are disconnected, thereby closing the shutoff valve in flow coupling 359 as described above. The oxygen-rich product gas is not humidified when the portable oxygen generator unit 3 operates in the uncoupled or portable mode.

To operate the system in the coupled or stationary mode, oxygen generator unit 3 is docked with stationary base unit 5, and electrical connector 335 is coupled with electrical connector 337 to recharge rechargeable power supply 339 as in the embodiment of FIG. 3. Flow couplings 359 and 363 are coupled and flow couplings 350 and 365 (if used) are also coupled. Oxygen is generated by air separation device 301 as earlier described, and non-humidified oxygen-rich gas flows to tank optional product storage tank 302 and from tank 302 via line 348. Air separation device 319 generates oxygen-rich gas that flows via line 345 to humidifier 347, the gas is humidified therein, and the humidified oxygen-rich gas flows via flow couplings 350 and 365 (if used), external connector line 361, flow couplings 359 and 363, and line 357. The combined flow of the non-humidified oxygen-rich gas from oxygen generator unit 3 and the humidified oxygen-rich gas from stationary base unit 5 flows via line 348, flow coupling 352 (which provides an oxygen-rich gas delivery port), flow coupling 354, and line 355 to the patient's cannula (not shown).

The maximum design product flow capacities of air separation devices 301 and 319 may be selected such that device 319 operates at or near its maximum flow capacity when portable oxygen generator unit 3 and stationary base unit 5 are operated in the coupled mode. For example, the maximum design product flow capacities of air separation devices 301 and 319 may be 3 and 2 liters per minute (lpm), respectively. In this example, coupled operation of portable oxygen generator unit 3 and stationary base unit 5 can provide humidified oxygen-rich product gas to the patient at flow rates between 2 and 5 lpm when air separation device 319 operates at its maximum design rate of 2 lpm.

The embodiment of FIG. 4 thus provides humidified oxygen-rich gas to the patient via line 355 wherein the humidification is provided by humidifying the oxygen-rich gas from air separation device 319 in humidifier 347 of stationary base unit 5 prior to combination with the non-humidified oxygen-rich gas from air separation device 301 of portable oxygen generator unit 3. In this embodiment, no humidification is provided for the oxygen-rich gas from air separation device 301 in either the portable or combined operating mode.

In the embodiment of FIG. 4, the same cannula may be used by the patient in either the portable or stationary mode of operation by connecting flow couplings 352 and 354. If flow couplings 350 and 365 are used, coupling 350 may be identical with coupling 352, which would enable the patient to connect cannula coupling 354 with coupling 350 in order to use only the base unit for the supply of product gas. This would provide oxygen-rich product gas to the patient at a lower flow rate when portable oxygen generator unit 3 is on standby or is out for servicing.

Several alternatives are possible in the embodiment of FIG. 4. In one alternative, separation device 301 comprises a pressure swing adsorption process utilizing at least four adsorbent beds, so that tank optional product storage tank 302 is not required to provide a constant flow of oxygen-rich product gas. In another alternative, flow couplings 350 and 365 are not used and line 361 is connected directly to the outlet of humidifier 347. In this alternative, the system is converted from the portable mode to the coupled mode by docking portable oxygen generator unit 3 with stationary base unit 5, which couples connectors 335 and 337 to provide for the recharging of rechargeable power supply 339. Flow couplings 359 and 363 are connected by the patient to provide humidified oxygen-rich product gas via line 355, which is connected at flow couplings 352 and 354.

Figure 5:
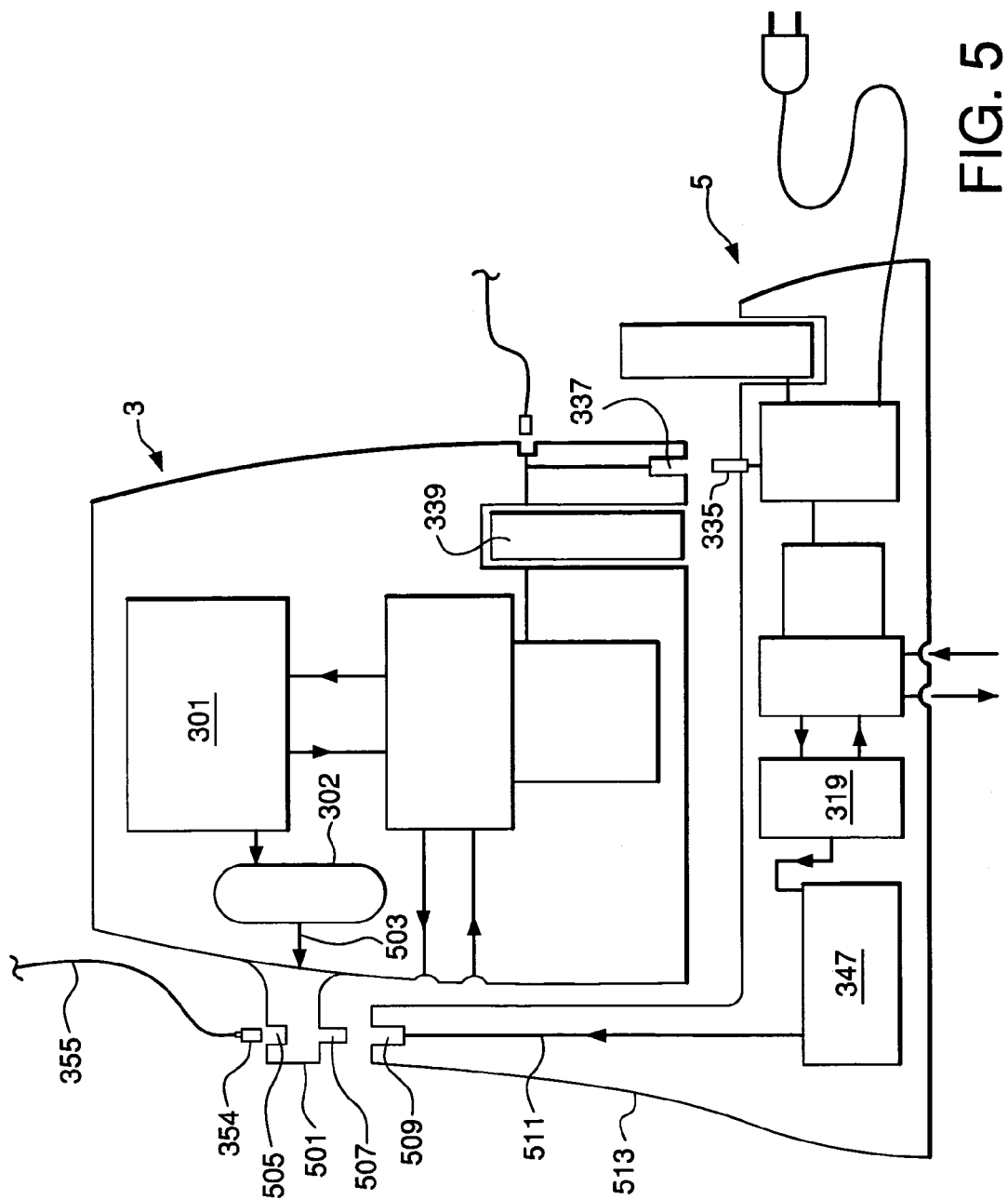
FIG. 5 is a schematic diagram of an alternative version of the embodiment of FIG. 4.

Another alternative to the embodiment of FIG. 4 is illustrated schematically in FIG. 5. In this alternative embodiment, piping means described as tee assembly 501 is mounted externally on the side wall of portable oxygen generator unit 3, and line 503 connects the side branch of the tee assembly with optional oxygen-rich product storage tank 302. The tee assembly is fitted with flow coupling 505, which is adapted to connect with flow coupling 354 to provide oxygen-rich product gas to the patient via line 355. The tee assembly also is fitted with flow coupling 507, which is adapted to connect with flow coupling 509 to receive humidified oxygen-rich produce gas via line 511 from humidifier 347 of stationary base unit 5. Tee assembly 501 is adapted to combine the humidified oxygen-rich gas and the non-humidified oxygen-rich gas to form a humidified oxygen-rich gas product, which is delivered via oxygen-rich gas product delivery port or flow coupling 505.

The casing of stationary base unit 5 may be provided with extension arm 513, which holds flow coupling 509 and line 511. Flow coupling 509 is fitted with a mechanically-activated shutoff valve that is in the open position when flow couplings 507 and 509 are connected and in the closed position when flow couplings 507 and 509 are disconnected. Flow couplings 507 and 509 may be, for example, any commercially-available quick coupling or quick-connect fitting that has a flow shutoff when disconnected. The remaining parts of oxygen generation system 1, which comprises portable oxygen generator unit 3 and stationary base unit 5, are the same as described with reference to FIG. 3.

Tee assembly 501 is shown schematically in FIG. 5 and may be integrated into the casing or housing of portable oxygen generator unit 3 in any appropriate manner by the designer of the unit. Likewise, extension arm 513 is shown schematically and may be integrated into the casing of portable stationary base unit 5 in any appropriate manner by the designer of the unit. For example, in an alternative to the configuration of FIG. 5, tee assembly 501 may be located closer to or at the bottom of the side of portable oxygen generator unit 3 with an internal extension of line 503 to the tee assembly. In this example, extension arm 513 portable stationary base unit 5 would be much shorter. A feature of the embodiment of FIG. 5, regardless of the actual design configuration of tee assembly 501 and extension arm 513, is that flow couplings 505 and 507 may be disposed externally to the casing or housing of portable oxygen generator unit 3.

Portable oxygen generator unit 3 in the system of FIG. 5 operates in the uncoupled or portable mode as earlier described and delivers non-humidified oxygen-rich product gas to the patient via line 503, flow couplings 354 and 505, and line 355. The system is converted from the portable mode to the coupled mode by docking portable oxygen generator unit 3 with stationary base unit 5, which couples connectors 335 and 337 to provide for the recharging of rechargeable power supply 339. Docking also connects flow couplings 507 and 509, thereby providing humidified oxygen-rich product gas via line 355.

Alternatives to the five embodiments described above may be envisioned wherein a patient wishes to travel for an extended period, for example in a motor vehicle, and requires a humidified oxygen-rich gas product, possibly at a rate higher than that generated by the portable unit alone. In any of these alternatives, stationary base unit 5 may be fitted with a DC power connection, carried in the motor vehicle, and connected to a DC power outlet in the motor vehicle so that the base unit and portable unit can be operated in the coupled mode. Alternatively, in the third, fourth, or fifth embodiments described above, the base unit alone could be taken by the patient for extended travel in a motor vehicle.

In any of the embodiments described above, the efficiency of oxygen usage by the patient may be increased significantly by using a conserver. This is a well-known device which typically uses an inhalation sensor to measure a parameter, for example pressure, at the cannula inlet. When the patient inhales, a reduced pressure is sensed and relayed to a control unit, which releases product gas from the product tank. When the patient exhales, an increased pressure is sensed and relayed to the control unit, which stops the release of product gas from the product tank. Any of the various types of conservers known in the art may be utilized in conjunction with any embodiment of the present invention. A conserver may be installed in stationary base unit 5 and/or in portable oxygen generator unit 3, and has appropriate piping and controls such that the patient can obtain oxygen-rich product either with or without the use of the conserver.

Oxygen generation system 1 of FIGS. 1, 2, 3, 4, and 5 may include a user interface (not shown) mounted on case 17 of portable oxygen generator unit 3. This interface comprises a control to turn the system on and off and a control to switch between continuous output and conserver mode. The interface may also have various lights to indicate when the unit is on, when the oxygen concentration is low, and other operating conditions or alarms. Audible alarms may also be used for conditions such as low oxygen flow or low battery charge level. A second interface, which may be located behind a panel on case 17 of portable oxygen generator unit 3, may be provided for the service technician or the patient to change the prescribed flow rate of oxygen-rich product based on the patient's doctor's advice. The control to change flow may be mechanical or digital and may have a digital readout of the flow rate setting. This interface may also contain a run time meter.

As mentioned above, any of air separation devices 7, 301, and 319 may be PSA systems wherein PSA operation may include a cycle with adsorption at superatmospheric pressure and desorption at subatmospheric pressure. A typical PSA system for use in this application may include multiple adsorbent beds and may use, for example, five adsorbent beds. An exemplary PSA system with five beds may use, for example, a cycle having process steps including adsorption/make product, first depressurization to provide pressurization gas to another bed, second depressurization to provide pressurization gas to yet another bed, optional idle step, countercurrent evacuation, purge using product gas, first pressurization by gas from another bed undergoing second depressurization, second pressurization by gas from yet another bed undergoing first depressurization, product repressurization, and feed repressurization. A typical cycle time may be 10 seconds.

Any of air separation devices 7, 301, and 319 may be PSA systems and may use a gas storage tank; for example, optional tank 15 of FIG. 1 may store the oxygen-rich gas from air separation device 7 and optional product storage tank 302 of FIGS. 3-5 may store the oxygen-rich gas from air separation device 301. Air separation device 319 in stationary base unit 5 (FIGS. 3-5) may use a gas storage tank (not shown) to store oxygen-rich gas prior to humidifier 347.

The PSA system of any of air separation devices 7, 301, and 319 may have multiple beds, for example, four or more beds, and the system may be operated through any appropriate cycle such that a gas storage tank is not required. In this case, for example, optional product gas storage tank 15 (FIG. 1) or 302 (FIGS. 3-5) would not be necessary. Likewise, a product storage tank following air separation device 319 would not be necessary.

Control of gas flow to and from the beds may be effected by a pair of rotary valves, one for the feed ends and one for the product ends of the beds. The rotary valves may be operated by a common shaft operated by a single motor. Rotary valves of this type are described, for example, in a copending United States patent application having Ser. No. 10/295,144 filed on Nov. 15, 2002. This patent application is incorporated herein by reference.

The adsorbent beds in this exemplary PSA system may include two layers of adsorbent material wherein a layer of adsorbent for water removal (for example, NaX zeolite or activated alumina) is installed at the inlet end of each bed and a layer of nitrogen-selective adsorbent for air separation (for example, LiX zeolite) is installed between the water removal adsorbent and the bed outlet. The adsorbents may be conventional particles having diameters in the range of 0.25 mm to 1.0 mm to give a balance between fast mass transfer and reasonable pressure drop. Alternatively, the adsorbents may be utilized in the form of monoliths, laminates, or other types of structures known in the art. Typical bed dimensions for the production of 3 LPM of 93 mole % oxygen are a height of 87 mm and a diameter of 53 mm. The minimum cycle pressure may be 0.25 to 0.65 atma and the maximum cycle pressure may be 1.3 to 2.5 atma.

Alternatively, any of air separation devices 7, 301, and 319 may be membrane-based systems utilizing either polymeric membranes operating at near ambient temperatures or mixed metal oxide ion transport membranes operating at elevated temperatures. In view of the present state of the art in membrane-based air separation systems, these systems may be best suited for use in air separation device 319 in stationary base unit 5 of FIG. 3, in which weight and volume are less critical when compared with portable oxygen generator unit 3. A variation of the third embodiment (FIG. 3) may be envisioned, for example, in which air separation device 319 is a mixed metal oxide ion transport membrane system and air separation device 301 is a PSA system.

Any of rechargeable power supplies 13, 65, and 339 may be rechargeable batteries sized for a proper balance between weight and operating life. In this case, stationary power supply systems 63 and 333 (FIGS. 1 and 3) may include an AC to DC power converter and a DC battery charger adapted to recharge the rechargeable battery or batteries when portable oxygen generator unit 3 and stationary base unit 5 are coupled. Batteries and power supply systems for such service are well-known and commercially available.

Alternatively, any of rechargeable power supplies 13, 65, and 339 may be fuel cell systems operating, for example, on hydrogen or methanol. Each fuel cell system would include a fuel cell and means for storing hydrogen or methanol, and would be sized for a proper balance of weight and operating life. In this case, each stationary power supply system in the base unit also may include fuel cell systems operating, for example, on hydrogen or methanol. Each fuel cell system in the base unit would include a fuel cell to generate power to operate the drive motors, may include integrated means for storing hydrogen or methanol, or alternatively may be connected to an external source of fuel. The stationary power supply system would be adapted to supply fuel to rechargeable power supplies 13, 65, and 339 when portable oxygen generator unit 3 and base unit 5 are coupled.

The use of combinations of fuel cells and batteries can be envisioned for operating the dual mode generator. For example, the stationary power supply system in base unit 5 may include an AC power supply to operate drive motors 67, 203, and 329 and portable oxygen generator unit 3 may include a fuel cell system. In this case, the base unit power supply system may include an electrolysis unit to generate hydrogen for recharging the fuel cell system when portable oxygen generator unit 3 and base unit 5 are coupled.

The five embodiments described above may be designed and operated to provide ranges of oxygen-rich gas production rates in the coupled and uncoupled modes of operation. The embodiments also may include optional functions for the design and operation of the stationary base unit. A series of five exemplary embodiments are described below to illustrate the invention, but are not intended to limit the scope of the invention in any way. The five exemplary embodiments are summarized in Table 1.

TABLE 1

Summary of Exemplary Embodiments

| | | Portable Unit | | | Stationary Unit | |
|---|---|---|---|---|---|---|
| Embodiment | Design | Mode | Operation | Design | Mode | Operation |
| 1 (FIG. 1) | Adsorbers (0.5-5 LPM) Pump (0.5-5 LPM) Motor (0.5-3 LPM) | Portable | Adsorbers (0.5-3 LPM) Pump (0.5-3 LPM) Motor (0.5-3 LPM) | Motor (0-2 LPM) | Portable | Note (1) |
| | | Coupled | Adsorbers (0.5-5 LPM) Pump (0.5-5 LPM) Motor (0.5-3 LPM) | | Coupled | Motor (0-2 LPM) linked with Motor (0.5-3 LPM) in portable unit |
| 1A (FIG. 1) | Adsorbers (0.5-5 LPM) Pump (0.5-5 LPM) Motor (0.5-3 LPM) | Portable | Adsorbers (0.5-3 LPM) Pump (0.5-3 LPM) Motor (0.5-3 LPM) | Motor (0.5-5 LPM) | Portable | Note (1) |
| | | Coupled | Adsorbers (0.5-5 LPM) Pump (0.5-5 LPM) | | Coupled | Motor (0.5-5 LPM) provides total drive for Pump (0.5-5 LPM) in portable unit |
| 2 (FIG. 2) | Adsorbers (0.5-5 LPM) Pump (0.5-5 LPM) Motor (0.5-3 LPM) | Portable | Adsorbers (0.5-3 LPM) Pump (0.5-3 LPM) Motor (0.5-3 LPM) | Pump (0-2 LPM) Motor (0-2 LPM) | Portable | Note (1) |
| | | Coupled | Adsorbers (0.5-5 LPM) | | Coupled | Pump (0-2 LPM) and |

TABLE 1-continued

Summary of Exemplary Embodiments

| | Portable Unit | | | Stationary Unit | | |
|---|---|---|---|---|---|---|
| Embodiment | Design | Mode | Operation | Design | Mode | Operation |
| 2A (FIG. 2) | Adsorbers (0.5-5 LPM) Pump (0.5-3 LPM) Motor (0.5-3 LPM) | Portable Coupled | Pump (0.5-3 LPM) Motor (0.5-3 LPM) Adsorbers (0.5-3 LPM) Pump (0.5-3 LPM) Motor (0.5-3 LPM) Adsorbers (0.5-5 LPM) | Pump (0.5-5 LPM) Motor (0.5-5 LPM) | Portable Coupled | Motor (0-2 LPM) provides feed air to portable unit Note (1) Pump (0.5-5 LPM) and Motor (0.5-5 LPM) provide all feed air to portable unit |
| 3 (FIG. 3) | Adsorbers (0.5-5 LPM) Pump (0.5-3 LPM) Motor (0.5-3 LPM) | Portable Coupled | Adsorbers (0.5-3 LPM) Pump (0.5-3 LPM) Motor (0.5-3 LPM) Adsorbers (0.5-3 LPM) Pump (0.5-3 LPM) Motor (0.5-3 LPM) | Adsorbers (0-7 LPM) Pump (0-7 LPM) Motor (0-7 LPM) | Portable Coupled | Note (1) Adsorbers (0-7 LPM), Pump (0-7 LPM), and Motor (0-7 LPM) provide $O_2$ |

Note (1)
During portable unit operation, stationary unit may recharge optional spare portable power supply Exemplary Embodiment 1

This embodiment uses the system of FIG. 1 as described above. In this embodiment, portable air separation device 7 is a PSA system sized to deliver 0.5 to 5 LPM of oxygen-rich gas product with a purity of at least 80 mole % oxygen. Gas pump 9 is designed to provide sufficient pressurized air feed to the PSA system and withdraw sufficient waste gas from the PSA system so that the system can generate the required range of 0.5 to 5 LPM of oxygen-rich gas product. Gas pump primary drive motor 11 is designed to drive gas pump 9 to provide sufficient air to the portable air separation device to generate 0.5 to 3 LPM of oxygen-rich gas. Booster motor 67 in stationary base unit 5 is designed to drive the primary gas pump to provide sufficient air to the portable air separation device to generate 0 to 2 LPM of oxygen-rich gas. Primary drive motor 11 is designed to be coupled with booster motor 67, and the coupled drive motors are designed to provide sufficient air to the portable air separation device to generate 0.5 to 5 LPM of oxygen-rich gas.

In uncoupled or portable operation, portable air separation device 7 is carried by the patient and operates on power from rechargeable power supply 13, which is a battery. The PSA system generates 0.5 to 3 LPM of oxygen-rich gas and delivers the gas to the patient via cannula 57. Gas pump 9 and primary drive motor 11 operate to provide sufficient pressurized air feed to the PSA system and withdraw sufficient waste gas from the PSA system so that the system can generate the required range of 0.5 to 3 LPM of oxygen-rich gas product. During portable operation of portable air separation device 7, stationary base unit 5 is on standby and charges spare rechargeable battery 65.

The battery of rechargeable power supply 13, when fully charged, will operate the portable system at a production rate of 3 LPM for at least 60 minutes. If the patient anticipates requiring portable operation longer than the fully charged operating life of the battery in power supply 13, several options are possible in this embodiment as well as the following embodiments. In a first option, fully charged spare battery 65 is taken to replace depleted battery 13 when discharged. In a second option, conductor 27 is taken and connected to an external DC power source such as the power outlet in an automobile, and connector 25 then is joined with connector 23 to provide DC power via conductors 21 and 19.

In a third option, the patient takes an optional AC-DC converter (not shown) and connects to an alternative AC power source to provide DC power via conductor 27, connectors 23 and 35, and conductors 19 and 21.

In coupled operation in this embodiment, portable air separation device 7 and stationary base unit 5 are coupled by flow couplings 61 and 79, shaft coupling 77 and shaft connector 12, and connectors 31 and 75. During coupled operation, stationary base unit 5 and portable oxygen generator unit 3 are coupled and operated in tandem to supply 0.5 to 5 LPM of oxygen-rich product gas to a non-ambulatory patient located adjacent the tandem unit. In this mode, shaft coupling 77 is coupled with shaft connector 12 so that booster motor 67 operates in tandem with primary drive motor 11 to provide additional power to operate gas pump 9 at higher capacity. Flow coupling 79 is coupled with oxygen-rich gas outlet flow coupling 61 and delivers this gas to optional humidifier 69. Oxygen-rich product gas discharge port or flow coupling 81 is coupled with flow coupling 83 and oxygen-rich product gas is delivered to the patient via cannula 85. While operating in this tandem mode, the battery of rechargeable power supply 13 is recharged by power supply system 63 via connectors 31 and 75, conductor 29, and conductor 21. The battery of spare power supply system 65 is placed in receptacle 71 and recharged via conductor 73 during this time as needed.

Exemplary Embodiment 1A

This embodiment is identical to Embodiment 1 except for the method of driving gas pump 9 in the coupled mode. In the present embodiment, all power to drive gas pump 9 in the coupled mode is supplied by motor 67 via shaft coupling 77 and shaft connector 12. Motor 67 is a larger motor than that used as the booster motor in Embodiment 1 described above. Primary drive motor 11 is idle in this alternative version, and therefore the service life of this motor is increased because the motor is operated only in the portable mode. Motor 67 thus is sized to drive gas pump 9 so that the PSA system in portable air separation device 7 can generate 0.5 to 5 LPM of oxygen-rich product gas.

Exemplary Embodiment 2

This embodiment uses the system of FIG. 2 as described above. In this embodiment, portable air separation device 7 is a PSA system sized to deliver 0.5 to 5 LPM of oxygen-rich gas product with a purity of at least 80 mole % oxygen. Gas pump 202 is designed to provide sufficient pressurized air feed to the PSA system and withdraw sufficient waste gas from the PSA system so that the system can generate 0.5 to 3 LPM of oxygen-rich gas product. Gas pump 202 therefore is smaller than gas pump 9 of Embodiment 1. Gas pump primary drive motor 201 is designed in the present embodiment to drive gas pump 202 to provide sufficient air to the portable air separation device to generate 0.5 to 3 LPM of oxygen-rich gas.

Drive motor 203 and supplemental gas pump 205 are disposed in stationary base unit 5 and are sized to provide sufficient air to the portable air separation device to generate 0 to 2 LPM of oxygen-rich gas.

In this exemplary embodiment, portable oxygen generator unit 3 operates in the uncoupled mode as described for Embodiment 1 above. In the coupled mode, the coupled systems operate so that all feed gas to and all waste gas from the PSA system of air separation device 7 is provided by gas pump 202 in combination with gas pump 205. In the present embodiment, therefore, gas pump 202 is smaller than gas pump 9 of Embodiment 1, thereby reducing the weight of portable oxygen generator unit 3. When operating in the coupled mode, the system provides 0.5 to 5 LPM of oxygen-rich gas product via cannula 85. Other aspects of the operation in the coupled mode in the present embodiment are identical to those of Embodiment 1.

Exemplary Embodiment 2A

In this embodiment, all feed air in the coupled operating mode is supplied to air separation device 7 by gas pump 205 via lines 209 and 215, and all waste gas is withdrawn from air separation device 7 via lines 217 and 223 by gas pump 205. In this embodiment, the capacity of gas pump 205 and the output of drive motor 203 are increased compared with Embodiment 2 described above, and provide for a production rate of 0.5 to 5 LPM from the PSA system of air separation device 7. Primary drive motor 201 and gas pump 202 are not operated in the coupled mode of the present embodiment, and therefore the service lives of this motor and pump are increased because they are operated only in the uncoupled or portable mode. All other design and operating aspects of the present embodiment are identical to those of Embodiment 2 described above.

Exemplary Embodiment 3

This embodiment uses the system of FIG. 3 as described above. In this embodiment, both portable oxygen generator unit 3 and stationary base unit 5 have complete air separation systems which can operate in tandem in the coupled mode and independently in the uncoupled mode. In this embodiment, portable air separation device 301 is sized to generate 0.5 to 3 LPM of oxygen-rich gas, primary gas pump 303 is sized to provide sufficient air for the portable air separation device to generate 0.5 to 3 LPM of oxygen-rich gas, and primary drive motor 309 is sized to drive the primary gas pump to provide sufficient air to the portable air separation device to generate 0.5 to 3 LPM of oxygen-rich gas. Secondary gas pump 323 is sized to provide sufficient air to stationary air separation device 319 to generate 0-7 LPM of oxygen-rich gas, and stationary drive motor 329 is sized to drive the secondary gas pump to provide sufficient air to stationary air separation device 319 to generate 0-7 LPM of oxygen-rich gas.

In the uncoupled mode, portable oxygen generator unit 3 operates as described above for Embodiments 1 and 2, generating 0.5 to 3 LPM of oxygen-rich gas and supplying this gas to the patient via cannula 355. In the uncoupled mode, stationary base unit 5 may be operated to generate 0 to 7 LPM of oxygen-rich gas and supply this gas to the patient via cannula 353. This would be advantageous if portable oxygen generator unit 3 were out of service for maintenance or repair.

In the coupled mode, portable oxygen generator unit 3 and stationary base unit 5 are operated in tandem to generate 0-10 LPM of oxygen-rich gas and supply this gas to the patient via cannula 353. The present embodiment minimizes the weight of portable oxygen generator unit 3 compared with that of Embodiments 1, 1A, 2, and 2A described above because air separation device 301 may be sized to provide only the required amount of oxygen-rich product gas from portable oxygen generator unit 3 operating in the uncoupled mode, and need not be sized to provide additional product in the coupled mode. The type of gas pump 319 in the stationary base unit can be different than the type of gas pump 303 of the portable unit used in the portable generator, since low weight, low volume, and power efficiency are less critical for the base unit than the portable unit. The PSA system and process of the base unit also may be different from that of the portable unit, again since low weight, low volume, and power efficiency are less critical for the base unit than the portable unit.

Alternatives to the Exemplary Embodiments described above are possible regarding the flow of oxygen-rich gas product to the patient when portable oxygen generator unit 3 and stationary base unit 5 are operated in the coupled mode. In all of these alternative embodiments, humidified oxygen from stationary base unit 5 flows to portable oxygen generator unit 3 and is delivered to the patient via the cannula coupled to portable oxygen generator unit 3 for both the coupled mode and the uncoupled mode of operation of oxygen generator unit 3 and stationary base unit 5.

In the alternative embodiments to Exemplary Embodiments 1 and 1A, referring to FIG. 1, the flow of humidified oxygen-rich gas from humidifier 69 is returned to portable oxygen generator unit 3 via flow couplings (not shown) and a line (not shown) that connects with line 51. Flow coupling 81, flow coupling 83, and cannula 85 are not used in these alternative embodiments. The humidified oxygen-rich gas passes through coupled flow couplings 53 and 55 and through cannula 57 to the patient.

In the alternatives to Exemplary Embodiments 2 and 2A, referring to FIG. 2, the flow of humidified oxygen-rich gas from humidifier 225 is returned to portable oxygen generator unit 3 via flow couplings (not shown) and a line (not shown) that connects with line 51. Flow coupling 81, flow coupling 83, and cannula 85 are not used in these alternative embodiments. The humidified oxygen-rich gas passes through coupled flow couplings 53 and 55 and through cannula 57 to the patient.

In the alternative to Exemplary Embodiment 3, referring to FIG. 3, the flow of humidified oxygen-rich gas, from humidifier 347 is returned to portable oxygen generator unit 3 via flow couplings (not shown) and a line (not shown) that connects with line 348. Flow coupling 350, flow coupling 351, and cannula 353 are not used in these alternative embodiments. The humidified oxygen-rich gas passes through coupled flow couplings 352 and 354 and through cannula 355 to the patient.

Exemplary Embodiment 2 above is illustrated in the following Examples by two process simulations of the process system of FIG. 2. The Examples do not limit the invention to any of the specific details described therein.

EXAMPLE 1

The independent operation of portable oxygen generator unit 3 of FIG. 2 was simulated using SIMPAC gas adsorption process simulation software based on descriptions given by D. G. Hartzog and S. Sircar in *Adsorption*, Vol. 1, pp. 133-151 (1995) and S. Sircar et al in *Separation and Purification Technology*, Vol. 17(1), pp. 11-20 (1999). Air separation device 7 is a 5 bed PSA system operated with a 0.753 ACFM (actual cubic feet per minute) compressor and a 1.088 ACFM vacuum pump. The cycle time is 10 seconds and the pressure envelope is 0.514 atma to 1.5138 atma for a pressure ratio of 2.94. Each adsorber bed is 53 mm in diameter and 87 mm in height. The bed contains a layer of NaX zeolite 26 mm deep at the feed end for water removal followed by a layer 61 mm deep of a highly lithium-exchanged, low-silica, X-type zeolite for air separation. The system produces 3.28 LPM of oxygen-rich gas at 93% oxygen purity.

The cycle steps used in the simulated process are described in Table 2 below.

TABLE 2

Process Cycle Steps for Example 1

| Step Number | Description | Duration, Sec. |
|---|---|---|
| 1 | Feed/make product/provide purge | 1.0 |
| 2 | Feed/make product/provide repress. gas | 1.0 |
| 3 | provide 1st repressurization gas | 1.0 |
| 4 | provide 2nd repressurization gas | 1.0 |
| 5 | Idle step | 1.0 |
| 6 | Evacuation | 1.0 |
| 7 | Purge with product gas | 1.0 |
| 8 | Receive 2nd repressurization gas | 1.0 |
| 9 | Receive 1st repressurization gas | 1.0 |
| 10 | Repressurize with product gas | 1.0 |

During the initial portion of Step 1, the feed step, there is a short period of feed pressurization before product gas flows from the bed. A cycle chart is given in Table 3 to show the relationship of cycle steps among the five adsorbent beds.

TABLE 2

Cycle Chart for Example 1

| Bed | Step Number | | | | | | | | | |
|---|---|---|---|---|---|---|---|---|---|---|
| 1 | 1 | 2 | 3 | 4 | 5 | 6 | 7 | 8 | 9 | 10 |
| 2 | 9 | 10 | 1 | 2 | 3 | 4 | 5 | 6 | 7 | 8 |
| 3 | 7 | 8 | 9 | 10 | 1 | 2 | 3 | 4 | 5 | 6 |
| 4 | 5 | 6 | 7 | 8 | 9 | 10 | 1 | 2 | 3 | 4 |
| 5 | 3 | 4 | 5 | 6 | 7 | 8 | 9 | 10 | 1 | 2 |

EXAMPLE 2

The coupled operation of portable oxygen generator unit 3 and stationary base unit 5 was simulated again using the same PSA system and 10 second cycle of Example 1. In the operation of both gas pumps 202 and 205 in the coupled mode, the combined compression capacity is 1.243 ACFM and the combined vacuum pump capacity is 1.795 ACFM. The pressure envelope is 0.474 atma to 2.297 atma for a pressure ratio of 4.85. This coupled mode of operation produces 5.81 LPM of total product at 93% oxygen purity.

The invention claimed is:

1. An oxygen concentrator system comprising
   (a) a portable oxygen generator unit comprising a portable air separation device for the generation of a non-humidified oxygen-rich gas, a first gas pump including means to supply air to the portable air separation device, a first motor adapted to drive the first gas pump, a rechargeable power supply system adapted to provide power to drive the first motor, a first connector adapted to provide recharging of the rechargeable power supply system, a first flow coupling adapted to receive a humidified oxygen-rich gas, piping means adapted to combine the non-humidified oxygen-rich gas and the humidified oxygen-rich gas to form a humidified oxygen-rich gas product, and an oxygen-rich gas product delivery port; and
   (b) a stationary base unit adapted to couple with the portable oxygen generator unit, wherein the stationary base unit comprises a stationary air separation device and a humidifier for generating the humidified oxygen-rich gas, a second gas pump including means to supply air to the stationary air separation device, a second motor adapted to drive the second gas pump, a second flow coupling adapted to connect with the first flow coupling, piping to transfer the humidified oxygen-rich gas to the second flow coupling, a stationary power supply system adapted to provide power to the secondary motor, and a second connector adapted to connect with the first connector to provide recharging of the rechargeable power supply system in the portable oxygen generator unit when the units are coupled.

2. The oxygen generation system of claim 1 wherein the first flow coupling, piping means adapted to combine the non-humidified oxygen-rich gas and the humidified oxygen-rich gas, and the oxygen-rich gas product delivery port are attached to and disposed externally to the portable oxygen generator unit.

3. The system of claim 1 wherein the portable air separation device is sized to generate 0.5 to 3 LPM of non-humidified oxygen-rich gas, the first gas pump is sized to provide sufficient air for the portable air separation device to generate 0.5 to 3 LPM of non-humidified oxygen-rich gas, the first motor is sized to drive the first gas pump to provide sufficient air to the portable air separation device to generate 0.5 to 3 LPM of non-humidified oxygen-rich gas, the second gas pump is sized to provide sufficient air to the stationary air separation device to generate 0 to 7 LPM of humidified oxygen-rich gas, and the second motor is sized to drive the second gas pump to provide sufficient air to the stationary air separation device to generate 0 to 7 LPM of humidified oxygen-rich gas.

4. The system of claim 1 wherein the first gas pump includes means to withdraw gas from the portable air separation device and the second gas pump includes means to withdraw gas from the stationary air separation device.

5. The system of claim 1 wherein the portable oxygen generator unit further comprises a storage tank adapted to hold the non-humidified oxygen-rich gas.

6. The system of claim 1 wherein the portable oxygen generator unit further comprises a conserver adapted to regulate the flow of non-humidified oxygen-rich gas product supplied to the user by the cannula attached to the oxygen-rich gas product delivery port.

7. The system of claim 1 wherein the portable air separation device comprises a pressure swing adsorption system.

8. The system of claim 7 further comprising a storage tank adapted to receive non-humidified oxygen-rich gas from the pressure swing adsorption system.

9. The system of claim 7 wherein no gas storage tank is provided to receive non-humidified oxygen-rich gas from the pressure swing adsorption system.

10. The system of claim 1 wherein the stationary air separation device comprises a pressure swing adsorption system.

11. The system of claim 10 further comprising a storage tank adapted to receive oxygen-rich product gas from the pressure swing adsorption system.

12. The system of claim 10 wherein no storage tank is provided to receive oxygen-rich gas from the pressure swing adsorption system.

13. The system of claim 1 wherein the stationary base unit further comprises a spare rechargeable power supply and means to recharge the spare rechargeable power supply.

14. The system of claim 1 wherein the rechargeable power supply system is a rechargeable battery.

15. The system of claim 14 wherein the stationary power supply system comprises an AC to DC power converter and a DC battery charger adapted to recharge the rechargeable battery.

16. The system of claim 1 wherein the portable air separation device further comprises a power connector to receive DC power from an external source.

17. The system of claim 1 wherein the rechargeable power supply includes a portable fuel cell system comprising a fuel cell and portable fuel storage means.

18. The system of claim 17 wherein the fuel is hydrogen or methanol.

19. The system of claim 1 wherein the stationary power supply system comprises a stationary fuel cell system, stationary fuel storage means, and piping and connector means to transfer fuel to the portable fuel storage means when the stationary base unit is coupled with the portable oxygen generator unit.

20. The system of claim 19 wherein the fuel is hydrogen or methanol.

21. A method to generate an oxygen-rich gas product comprising
(a) providing a portable oxygen generator unit comprising a portable air separation device for the generation of a non-humidified oxygen-rich gas, a first gas pump including means to supply air to the portable air separation device, a first motor adapted to drive the first gas pump, a rechargeable power supply system adapted to provide power to the first motor, a first connector adapted to provide recharging of the rechargeable power supply system, a first flow coupling adapted to receive a humidified oxygen-rich gas, piping means adapted to combine the non-humidified oxygen-rich gas and the humidified oxygen-rich gas to form a humidified oxygen-rich gas product, and an oxygen-rich gas product delivery port;
(b) providing a stationary base unit adapted to couple with the portable oxygen generator unit, wherein the stationary base unit comprises a stationary air separation device and a humidifier for the generation of the humidified oxygen-rich gas, a second gas pump including means to supply air to the stationary air separation device, a second motor adapted to drive the second gas pump, a second flow coupling adapted to connect with the first flow coupling, piping to transfer the humidified oxygen-rich gas to the second flow coupling, a stationary power supply system adapted to provide power to the second motor, and a second connector adapted to connect with the first connector to provide recharging of the rechargeable power supply system of the portable oxygen generator unit when the units are coupled;
(c) operating the portable oxygen generator unit and the stationary base unit in an uncoupled mode wherein the portable oxygen generator unit is operated to separate air and provide the non-humidified oxygen-rich gas as an oxygen-rich gas product at a first flow rate to a user via a cannula attached to the oxygen-rich gas product delivery port; and
(d) operating the portable oxygen generator unit and the stationary base unit in a coupled mode by
(1) coupling the portable oxygen generator unit and the stationary base unit by connecting the first and second connectors and connecting the first and second flow couplings,
(2) operating the portable oxygen generator unit to separate air and provide the non-humidified oxygen-rich gas,
(3) operating the stationary base unit to separate air and provide an oxygen-rich gas stream, humidifying the oxygen-rich gas stream to provide the humidified oxygen-rich gas, combining the humidified oxygen-rich gas with the non-humidified oxygen-rich gas to form a humidified oxygen-rich gas product, and supplying the humidified oxygen-rich gas product at a second flow rate to a user via the cannula attached to the oxygen-rich gas product delivery port, wherein the second flow rate is greater than the first flow rate.

22. The method of claim 21 wherein the portable oxygen generator unit and the stationary base unit are operated in the coupled mode and the coupled system generates the humidified oxygen-rich gas product at a flow rate in the range of 0.5 to 10 LPM.

23. The method of claim 22 wherein the portable oxygen generator unit is operated in the uncoupled mode and generates the non-humidified oxygen-rich gas at a flow rate in the range of 0.5 to 3 LPM.

24. The method of claim 21 wherein the humidified oxygen-rich product gas contains greater than 85 mole % oxygen.

25. The method of claim 21 wherein the first motor is driven by externally-provided DC power when the portable oxygen generation unit is operated in the uncoupled mode.

* * * * *